United States Patent [19]

Ai et al.

[11] Patent Number: 4,528,332
[45] Date of Patent: Jul. 9, 1985

[54] EPOXY COMPOUNDS, PROCESS FOR THE PREPARATION THEREOF AND RESIST MATERIALS COMPRISING THEREOF

[75] Inventors: Hideo Ai; Akihiko Ikeda; Yoshio Matsuoka, all of Fuji, Japan

[73] Assignee: Asahi Kasei Kogyo Kabushiki Kaisha, Osaka, Japan

[21] Appl. No.: 567,481

[22] Filed: Jan. 3, 1984

[30] Foreign Application Priority Data

Jan. 6, 1983 [JP] Japan .................................. 58-255
Mar. 3, 1983 [JP] Japan ................................ 58-33818

[51] Int. Cl.$^3$ .................................................. C08F 8/08
[52] U.S. Cl. ............................. 525/332.2; 204/159.14; 525/386; 430/966
[58] Field of Search ...................... 526/273; 525/332.2

[56] References Cited

FOREIGN PATENT DOCUMENTS 149012 11/1981 Japan .................................. 526/273
317669 10/1971 U.S.S.R. .

*Primary Examiner*—Christopher A. Henderson
*Attorney, Agent, or Firm*—Sprung, Horn, Kramer & Woods

[57] ABSTRACT

Novel copolymers having a weight average molecular weight of 500 to 5,000,000 and comprising 1 to 99% by weight of a recurring unit represented by the formula (I), 1 to 99% by weight of a recurring unit represented by the formula (II) and 0 to 98% by weight of a recurring unit represented by the formula (III):

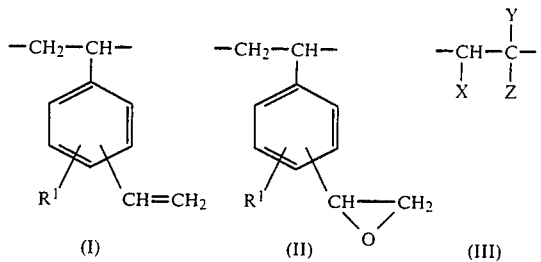

wherein $R^1$ is a hydrogen atom or a methyl group; X is a hydrogen atom, a methyl group or a phenyl group; Y is a hydrogen atom, a halogen atom, a methyl group, a phenyl group or a cyano group; and Z is a phenyl group, a phenyl group substituted by at least one alkyl group having 1 to 8 carbon atoms, a polycyclic aromatic hydrocarbon group having 10 to 20 carbon atoms, a cyano group, —COOR$^2$ (in which R$^2$ is an alkyl group having 1 to 20 carbon atoms or an aromatic hydrocarbon group having 6 to 14 carbon atoms), —COR$^3$ (in which R$^3$ is an alkyl group having 1 to 12 carbon atoms or an aromatic hydrocarbon group having 6 to 14 carbon atoms), a nitro group, a pyridyl group,

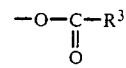

(in which R$^3$ has the same meaning as defined above), or a halogen atom. The above-mentioned copolymers are useful as resist materials which are sensitive to high-energy radiations.

20 Claims, No Drawings

EPOXY COMPOUNDS, PROCESS FOR THE PREPARATION THEREOF AND RESIST MATERIALS COMPRISING THEREOF

This invention relates to novel copolymers having pendant epoxy groups which are useful as resist materials sensitive to high-energy radiations.

Materials sensitive to high-energy radiations have heretofore been often used in printing plates, UV inks, UV curable coatings and the like, and in recent years, a remarkable development has taken place in the field of resist materials for forming fine patterns. Particularly, the formation of high density integrated circuits (IC) and large-scale integrated circuit (LSI) requires materials which can form finer patterns.

Resist materials are classified into the positive type resists that when they are subjected to irradiation with high-energy radiations the irradiated portions are decomposed and removed by a development treatment, and the negative type resists that when they are subjected to said pg,4 irradiation, the irradiated portions are insolubilized and the unirradiated portions are removed by a development treatment.

In order to produce a circuit, a resist is formed on a substrate, such as a silicon wafer and a pattern is then formed by irradiation with high-energy radiations followed by development, after which the substrate is etched. Now, in the field of lithography including LSI and the like, the trend to dry etching system is marked, and resist materials are urgently required to have etching resistance. That is to say, the resist materials are required to have performance characteristics such as high sensitivity, high resolution, etching resistance, heat resistance, adhesion to substrates and the like.

Resist materials are now being energetically developed, and those having various chemical structures are proposed. One group of the material includes high molecular weight compounds having epoxy groups. For example, it has been described by J. L. Bartelt and E. D. Feit in the Journal of Electrochemical Society, 122, 541 (1975) that poly(glycidyl methacrylate), epoxidized polyisoprene, epoxidized polybutadiene and the like have a very high sensitivity as negative type electron beam resists. Glycidyl methacrylate/ethyl acrylate copolymer and poly(glycidyl methacrylate) are already on the market. However, they are poor in resolution and dry etching resistance though they have a high sensitivity. Owing to demand for formation of high density LSI, the resolution of resist is required to be further increased, and for this purpose, it is necessary to further decrease the thickness of a coated resist. As a result, a resist material is desired which has a sufficient dry etching resistance at a smaller thickness.

In consideration of the background described above, the present inventors have conducted extensive research, to find a novel copolymer having pendant vinyl groups and pentant epoxy groups as indicated hereinafter and have clarified that when this compound is used as a resist material, a high sensitivity, a high resolution and a good dry etching resistance are obtained.

The compound disclosed in this invention is a copolymer having a weight average molecular weight of 500 to 5,000,000 and comprising 1 to 99% by weight of recurring unit represented by the formula (I), 1 to 99% by weight of a recurring unit represented by the formula (II) and 0 to 98% by weight of a recurring unit represented by the formula (III) (said copolymer being hereinafter referred to as Copolymer A):

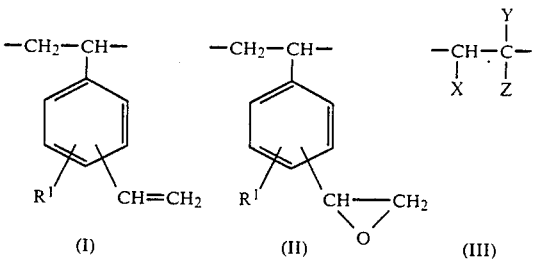

wherein $R^1$ is a hydrogen atom or a methyl group; X is a hydrogen atom, a methyl group or a phenyl group; Y is a hydrogen atom, a halogen atom, a methyl group, a phenyl group or a cyano group; and Z is a phenyl group, a phenyl group substituted by at least one alkyl group having 1 to 8 carbon atoms, a polycyclic aromatic hydrocarbon group having 10 to 20 carbon atoms, a cyano group, —$COOR^2$ (in which $R^2$ is an alkyl group having 1 to 20 carbon atoms or an aromatic hydrocarbon group having 6 to 14 carbon atoms), —$COR^3$ (in which $R^3$ is an alkyl group having 1 to 12 carbon atoms or an aromatic hydrocarbon group having 6 to 14 carbon atoms), a nitro group, a pyridyl group,

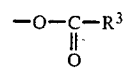

(in which $R^3$ has the same meaning as defined above), or a halogen atom.

In said formulas, as $R^1$, a hydrogen atom is preferred, and as X, a hydrogen atom and a phenyl group are preferred. Examples of Y include a hydrogen atom, a methyl group, a phenyl group, a cyano group, a chlorine atom and the like, among which a hydrogen atom and a phenyl group are preferred. Examples of Z include a phenyl group, a tolyl group, an ethylphenyl group, a naphthyl group, an anthryl group, a phenanthryl group, a cyano group, an ethoxycarbonyl group, a methyoxycarbonyl group, an acetyl group, a benzoyl group, a nitro group, a pyridyl group, an acetyloxy group, a benzoyloxy group, a chlorine atom and the like, but from the viewpoint of dry etching resistance, a phenyl group, a phenyl group substituted by at least one alkyl group having 1 to 8 carbon atoms and a polycyclic aromatic group having 10 to 20 carbon atoms are preferred. Of these combinations, more preferable combinations are expressed as follows in the (X, Y, Z) form: (H, H, Ph), (H, H, Et-Ph), (H, H, 1-Naph), (H, H, 2-Naph), (H, H, 1-Anth), (H, H, 2-Anth), (H, H, 9-Anth), (H, H, 2-Phena), (H, H, 3-Phena), (Ph, H, Ph), (H, Ph, Ph), etc. wherein the symbols "Ph", "Et-Ph", "Naph", "Anth" and "Phena" represent a phenyl group, an ethylphenyl group, a naphthyl group, an anthryl group and a phenanthryl group, respectively.

As to the proportion of the recurring unit represented by the formula (III) in this case, with an increase of the proportion, the storage stability of the resulting copolymer and the solubility thereof in a developing solvent are improved at the same time. However, when the proportion is too great, the resulting copolymer has a decreased sensitivity as a negative type resist. Therefore, such a great proportion is not desirable. For example, in the case of (H, H, Ph), said proportion is preferably about 20% to about 80%. When at least one of Y and Z in the (X, Y, Z) form is a hydrogen atom or a group other than such hydrocarbon groups as alkyl groups, aryl groups and the like, many of the resulting copolymers have not only an improved storage stability but also an improved resolution under the same conditions, as compared with those containing no recurring unit represented by the structural formula (III). Some of the resulting copolymers have, in addition thereto, a very high film strength or a very strong adhesion to a substrate such as a silicon wafer. Specific, preferable combinations of X, Y and Z in the recurring unit represented by the formula (III) are expressed as follows in the (X, Y, Z) form: (H, CH$_3$, CN), (H, CH$_3$, COOCH$_3$), (H, CN, COOC$_2$H$_5$), (H, CN, CN), (H, Cl, CN), (H, C$_6$H$_5$, COOCH$_3$), (H, CH$_3$, COC$_6$H$_5$), (H, H, NO$_2$), (H, H, pyridyl), (C$_6$H$_5$, H, pyridyl), (H, H, OCOC$_6$H$_5$), (H, H, Cl), (H, Cl, Cl), (H, H, COOCH$_3$), (H, H, COCH$_3$), (C$_6$H$_5$, H, COCH$_3$), (H, H, CN), (H, H, O—COCH$_3$), etc. As to the proportion of the recurring unit represented by the formula (III) in this case, with an increase of the proportion, the storage stability of the resulting copolymer and the resolution thereof are increased. However, when the proportion is too great, the sensitivity and the dry etching resistance are decreased and the resolution is also decreased. Therefore, such a great proportion is not desirable.

The recurring unit represented by the formula (III) is not limited to one kind, and the overall performance characteristics of the resulting copolymer as a resist material can be further improved by using two or more kinds of said recurring units in a suitable ratio.

The position of the vinyl group in relation to the main chain in the formula (I) and the position of the epoxy group in relation to the main chain in the formula (II) are preferably para- or meta-positions, more preferably para-positions.

As to the proportions of the recurring units represented by the formulae (I), (II) and (III), although the most suitable proportions vary depending on the combination of X, Y and Z, the respective weight proportions of the units are preferably 2 to 60%, 10 to 70% and 10 to 90%, more preferably 10 to 50%, 20 to 60% and 30 to 70%.

In general, when the proportion of the recurring unit represented by the formula (I) becomes too great, the resulting copolymer has a lowered heat stability in some cases.

The weight average molecular weight of Copolymer A is preferably 1,000 to 1,000,000, more preferably 3,000 to 300,000. When the molecular weight is too low, the physical strength of the copolymer is lowered, and when it is too high, the solubility thereof in solvents is lowered. Therefore, none of these cases are desirable.

A process for producing Copolymer A is described below. Copolymer A is obtained by epoxidizing a polymer comprising the recurring units represented by the formula (I) (hereinafter referred to as Polymer B) or a copolymer comprising the recurring units represented by the formulae (I) and (III) (hereinafter referred to as Copolymer C).

Polymer B, namely, linear polydivinylbenzene can be obtained by reacting, in the presence of an amine such as diisopropylamine or the like, the corresponding lithium amide such as lithium diisopropylamide or the like with a monomer represented by the formula (IV):

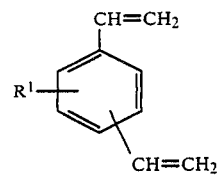

wherein R$^1$ has the same meaning as defined above (hereinafter referred to as Monomer IV) in an aprotic non-polar solvent such as tetrahydrofuran or the like. The details of this reaction are described in U.S. Pat. No. 4,336,361.

Further, Copolymer C is obtained by copolymerizing Monomer IV with a monomer represented by the formula (V):

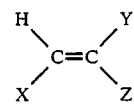

wherein X, Y and Z have the same meanings as defined above (hereinafter referred to as Monomer V) in the above-mentioned amide/amine mixture as in the synthesis of Polymer B. The details of this reaction are disclosed in Japanese patent application Kokai (Laid-Open) No.16509/81. In this case, as Monomer IV, m-divinylbenzene and p-divinylbenzene are preferred. Monomer V includes styrene, 1-vinylnaphthalene, 2-vinylnaphthalene, 1-vinylanthracene, 2-vinylanthracene, 9-vinylanthracene, 2-vinylphenanthlene, 3-vinylphenanthlene, 1,1-diphenylethylene, cis-stilbene, trans-stilbene, methacrylonitrile, vinylidene cyanide, methyl methacrylate, octyl methacrylate, ethyl a-cyanoacrylate, methyl α-chloroacrylate, α-chloroacrylonitrile, methyl α-phenylacrylate, phenyl isopropenyl ketone, nitroethylene, vinylpyridine, β-pyridylstyrene, vinyl benzoate, vinyl chloride, vinylidene chloride, etc. Further, when methyl methacrylate, methyl vinyl ketone, chalcone, acrylonitrile, vinyl acetate or the like is used, it is advisable to use a large amount of the aforesaid lithium amide.

Among Copolymers C, those in which X is a hydrogen atom and Y is a phenyl group, and Z is a phenyl group, an alkylphenyl group or a polycyclic aromatic hydrocarbon group can be obtained by copolymerizing Monomer IV with a monomer represented by the formula (VI) using a conventional anionic polymerization catalyst:

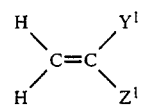

wherein Y$^1$ is a phenyl group; Z$^1$ is a phenyl group, a phenyl group substituted by at least one alkyl group having 1 to 8 carbon atoms, or a polycyclic aromatic hydrocarbon group having 10 to 20 carbon atoms (hereinafter referred to as Monomer VI). An explanation of this reaction is made below.

As the anionic polymerization initiator, alkyl metals may be used, among which alkyllithiums are preferred and include methyllithium, ethyllithium, n-propyllithium, isopropyllithium, n-butyllithium, sec-butyllithium, tert-butyllithium and the like. Of the alkyllithiums, ethyllithium, n-butyllithium, sec-butyllithium and tert-butyllithium are preferred because of easy availability.

The polymerization reaction can be performed in the presence of an inert medium which is inactive to the polymerization initiator and stable to both starting monomers and produced polymer. Examples of the inert media usable for the reaction of this invention include ethers such as diethyl ether, methyl ethyl ether, dibutyl ether and tetrahydrofuran; aromatic hydrocarbons such as benzene, toluene, xylenes and ethylbenzene; and aliphatic hydrocarbons such as pentanes, hexanes, butanes and cyclohexane.

The polymerization temperature is not critical, but a temperature of about 50° C. or less is preferable, and the range of about −90° C. to about 30° C. is more preferable.

The polymerization time is neither critical, but usually a period of about one minute to about 48 hours is employed.

The ratios among the Monomers IV, V and VI may be properly varied depending upon the composition of the copolymer to be produced and other matters.

The anionic polymerization initiator is used preferably in a molar ratio of about 0.0001 to about 0.1, more preferably about 0.0005 to about 0.01, per mol of the total amount of the monomers.

In case of using the inert medium, its amount is not critical, but the volume ratio of the medium to the whole monomers is preferably about 20/1 to about 1/1.

In the copolymer of this invention obtained by the anionic polymerization, each of the recurring units of the formulae (I), (II) and (III) may be arranged in the block form or at random. The arrangement of the recurring units can be adjusted by the method of feeding the starting monomers (for example, tap polymerization) or other means.

This reaction is partly described in detail by K. Hatada et al. in Polymer Bulletin, No. 9, pp. 228–235(1983).

Among Copolymers C, those in which both X and Y are hydrogen atoms and Z is an ethylphenyl group can be obtained by hydrogenating a part of the vinyl groups of Polymer B using a catalyst such as palladium-charcoal or the like.

Copolymer A is obtained by reacting an epoxidizing agent with Polymer B or Copolymer C. Although the epoxidizing agent is not critical, it includes, for example, perbenzoic acid; substituted perbenzoic acids such as m-chloroperbenzoic acid, p-methoxycarbonylperbenzoic acid, and the like; peracetic acid; substituted peracetic acids such as trifluoromethylperacetic acid and the like; aliphatic or aromatic peracids such as performic acid, perpropionic acid, monoperfumaric acid, monoperphthalic acid, percarboxylated polystyrene, and the like; mixtures of carboxylic acids such as formic acid, acetic acid, maleic anhydride and the like with hydrogen peroxide; and mixtures of metal complexes such as vanadium acetylacetonate, iron acetylacetonate, molybdenum tetracarbonyl and the like and peroxides such as hydrogen peroxide, t-butyl hydroperoxide and the like. Among them, perbenzoic acid and the substituted perbenzoic acids are preferred, and in particular, m-chloroperbenzoic acid is preferred from the viewpoint of both stability and reactivity.

In the epoxidation, it is preferable to use a solvent, and as the solvent, there are recommended, for example, halogenated hydrocarbons such as chloroform, methylene chloride, dichloroethane and the like; ketones such as acetone, methyl ethyl ketone and the like; ethers such as diethyl ether, dioxane, diglyme and the like; and esters such as ethyl acetate, methyl benzoate and the like.

Although the ratio between the amount of the epoxidizing agent and the amount of Polymer B or Copolymer C is not critical, the ratio of the number of moles of the epoxidizing agent to that of the double bonds in Polymer B or Copolymer C is preferably between 0.05 and 3, more preferably between 0.2 and 1.5.

The amount of the solvent is preferably 100 ml to 50 liters, more preferably 500 ml to 10 liters per mole of the epoxidizing agent. The reaction temperature is preferably −50° C. to 150° C., more preferably −20° C. to 60° C., and it is important to allow the reaction to proceed while controlling the temperature in the vicinity of room temperature (about 15°–25° C). Although the reaction time may be varied depending on the kind and amount of the epoxidizing agent and solvent, the reaction time and the like, it is, in general, preferably 10 minutes to 48 hours, more preferably 2 to 24 hours. The control of the degree of epoxidation can be achieved by changing the amount of the epoxidizing agent, the reaction temperature and the reaction time.

It is preferable to add an alkali in the reaction to neutralize the acid, which has been produced as a byproduct. Suitable alkalis are sodium hydroxide, sodium hydrogencarbonate and the like, and an aqueous solution thereof. Specifically, it is preferable to mix an aqueous solution of the above-mentioned alkali with the reaction mixture after completion of the reaction, or to allow the reaction to proceed while dispersing sodium carbonate powder or sodium hydrogencarbonate in the reaction mixture. The isolation of Copolymer A is conducted, when a water-insoluble solvent is used, by a method comprising washing with an alkali solution and then with water and thereafter removing the solvent by distillation, a method comprising separating by means of column chromatography or the like, or a recrystallization method.

The copolymers C can be used as a resist having excellent properties by utilizing their curability upon irradiation with high-energy radiations.

Here, the term "high-energy radiation" means electromagnetic wave having a wavelength of $10^{-14}$ to $10^{-4}$ cm, electron beam, and α-ray. The electromagnetic wave includes visible ray, ultraviolet ray, X-ray and the like. Among them, ultraviolet ray and electron beam are particularly useful. Especially, Copolymers C are useful for an electron-beam or X-ray resist for fine fabrication for producing semiconductors, photomasks and the like.

Generally, the negative type resist has a higher sensitivity than the positive type resist. For example, PGMA [poly(glycidyl methacrylate)] shows an electron beam sensitivity of about $5 \times 10^{-6}$ coulomb/cm$^2$ and an X-ray sensitivity of about 10 mJ/cm$^2$, but is poor in dry etching resistance. Said negative type resist is also poor in resolution owing to its peculiar bridges or scum, and it is not easy to form a submicron pattern with such resist.

By using Copolymer A it is possible to provide a resist having an excellent sensitivity to ionizing radiations such as ultraviolet ray, deep ultraviolet ray, electron beam and X-ray, having a high resolution, and also showing an excellent dry etching resistance.

A typical example of the method for forming a pattern by use of an ionizing radiation sensitive resist of this invention is shown below. First, Copolymer A prepared according to this invention is dissolved in a suitable solvent, for example, a ketone solvent or an aromatic solvent, to prepare a resist solution. This resist solution is uniformly applied onto a semiconductor substrate or a mask base by a spinner or other means to form a resist film of a desired thickness, and after removing the residual solvent, the resist film is subjected to a prebaking treatment for increasing the adhesiveness to the substrate. Then, the desired part of the resist film is exposed to an ionizing radiation such as an electron beam or an X-ray in a known manner and developed with a suitable developing solution such as an aromatic hydrocarbon solvent or an amide solvent. The non-exposed portion alone of the resist film is selectively dissolved away and the remaining portion is rinsed with a rinsing solution such as an alocholic solvent to form a resist pattern.

In the case of a semiconductor substrate, this resist pattern is used as a mask and the exposed portion is dry-etched with $CF_4$ gas, argon gas or the like to form a pattern, and finally the resist film is ashed off by use of $O_2$ plasma or other means to obtain an etched semiconductor substrate.

In order to cause crosslinking reaction by irradiation with ultraviolet rays, it is preferable to add a radical photoinitiator. The initiator includes benzophenone; substituted benzophenones such as bis(dimethylamino)benzophenone, bis(diethylamino)benzophenone, chlorobenzophenone, dichlorobenzophenone and the like; benzoin alkyl ethers such as benzoin methyl ether, benzoin isopropyl ether and the like; benzyl dialkyl ketals such as benzyl dimethyl ketal, benzyldiethyl ketal and the like; benzil; substituted acetophenones such as α-hydroxyacetophenone, 2,2'-diethoxyacetophenone, α-hydroxyisobutyrophenone, p-t-butyltrichloroacetophenone and the like; substituted anthraquinones such as 1-chloroanthraquinone, 2-ethylanthraquinone and the like; substituted thioxanthones such as 2-chlorothioxanthone, diisopropylthioxanthone, 2-methylthioxanthone and the like; phenyl glyoxylate, anthrone, etc. It is also preferable to co-use a sensitizer suitable for each initiator.

When used as a resist material, the copolymer of this invention may be mixed with a thermoplastic resin such as a linear polymer or copolymer or the like. Said polymer or copolymer includes polystyrene, poly(methyl methacrylate), polybutadiene, styrene-acrylonitrile copolymer, styrene-butadiene copolymer, etc.

Among them, polystyrene and the styrene copolymers are preferred.

Copolymer A is useful also as an epoxy resin. That is to say, Copolymer A is cured by mixing with a conventional crosslinking agent, and the cured product shows good resistance, in particular, to organic acids. When it is used as an epoxy resin, the epoxy equivalent of Copolymer A is preferably 150 to 4,000, more preferably 200 to 1,500.

As the curing agent, conventional ones may be used, including, for example, aliphatic polyamines such as diethylenetriamine and the like; aromatic polyamines such as methaphenylenediamine and the like; acid anhydrides such as phthalic anhydride and the like; polyamide resins; etc.

This invention is explained in more detail below referring to Examples, which are not by way of limitation but by way of illustration.

Analyzers or analytical methods used in the following Synthesis Examples, Examples and Referential Examples are as follows:

Weight-average molecular weight: Measured by means of GPC (gel permeation chromatography); TWINCLE (Nihon Bunko Co., Ltd.), column; A-803 and A-804 in series, and calibrated with the aid of standard polystyrene.

Infrared absorption spectrum: Measured by means of an infrared spectrometer (Hitachi Model 285) and a KBr tablet method, or a NUJOL method.

NMR (nuclear magnetic resonance spectrum): Measured by means of JEOL, JMR-GX400 FT-NMR (400 MHz).

Determination of epoxy equivalent (iodometry):

a. About 1 g of a sample was placed in an Erlenmeyer flask having a ground-glass joint, and the weight of the sample was exactly measured.

b. About 25 ml of benzyl alcohol was placed in the flask to dissolve the sample, and about 25 ml of n-propanol was added, after which the resulting mixture was refluxed.

c. Ten drops of a bromophenol blue indicator (1% n-propanol solution) were added, followed by adding an aqueous potassium iodide solution (3 g KI/5 g water). d. Titration was carried out with 1 N HCl. The end point was a point at which the color was changed from blue to red.

SYNTHESIS EXAMPLE 1

A 2-liter flask equipped with a stirrer, a dropping funnel and a thermometer was purged with nitrogen, and 500 ml of dried tetrahydrofuran and 200 g of diisopropylamine were placed therein and cooled to 0° C. Subsequently, 190 ml of a 15% by weight hexane solution of n-butyllithium was added dropwise with stirring. Thereto was added 50 g of styrene while maintaining the temperature at 0° C., and a solution of 50 g of p-divinylbenzene in 200 ml of tetrahydrofuran was continuously added at a rate of 30 ml/hr, after which the resulting mixture was continuously stirred in a stream of nitrogen for 8 hours. After 30 ml of methanol was added, the reaction mixture thus obtained was gradually added to a large amount of methanol to obtain white precipitates. The precipitate was collected by filtration, washed with water, and then dried to obtain 65.0 g of a white solid. The white solid was readily soluble in acetone, ethyl acetate, toluene, chloroform and the like. Its weight-average molecular weight determined by GPC (gel permeation chromatography) was 48,000. In its NMR spectrum, a broad absorption was observed at δ values in the vicinity of 0.8–3.0, which had a peak at 1.5, and broad singlets were observed at 5.0–5.3 and 5.5–5.8, and a broad absorption was also observed at 6.0–7.6, which had peaks at 6.6 and 7.1. From the relative intensities among the above-mentioned absorptions, the molar ratio of divinylbenzene to styrene was determined to be 5:4. Elementary analysis values were carbon 92.21% and hydrogen 7.72%. Hereinafter, the polymer thus obtained is referred to as VI-10.

SYNTHESIS EXAMPLE 2

A reaction was effected in the same manner as in Synthesis Example 1, except that the amount of styrene was changed to 70 g and the amount of p-divinylbenzene was varied to 30 g, to obtain 68.5 g of a white solid. The weight-average molecular weight of the white solid was determined by GPC as 32,000. The locations of absorptions of the NMR spectrum were substantially the same as those of VI-10. From the relative intensities among the absorptions, the molar ratio of divinylbenzene to styrene was determined to be 1:2. The elementary analysis values were carbon 92.25% and hydrogen 7.71%. Hereinafter, the polymer thus obtained is referred to as VI-11.

SYNTHESIS EXAMPLE 3

The same reactor as in Synthesis Example 1 was purged with nitrogen, and 500 ml of dry tetrahydrofuran, 50 g of m-divinylbenzene and 125 g of 1,1-diphenylethylene were placed therein and cooled to −20° C. Subsequently, 50 ml of a hexane solution of n-butyllithium was poured thereinto with stirring, after which the resulting mixture was stirred for 24 hours while maintaining the temperature at −20° C. Thereafter, the same procedure as in Synthesis Example 1 was carried out to obtain 69.2 g of a white solid. The weight-average molecular weight thereof was determined by GPC as 32,000. In its NMR spectrum, a broad absorption was observed at δ-values of 0.8 to 3.0, which had a peak at 1.7, and somewhat broad absorptions were observed at 5.0–5.3 and 5.5–5.9, and a broad absorption was also observed at 6.0–7.3, which had a shoulder at 6.5 and a peak at 7.0. From the intensity ratio among the absorptions, the molar ratio of m-divinylbenzene to diphenylethylene was determined to be 1:1. The elementary analysis values were carbon 92.83% and hydrogen 7.03%. Hereinafter, the polymer thus obtained is referred to as VI-20.

SYNTHESIS EXAMPLE 4

The same reactor as in Synthesis Example 1 was purged with nitrogen, and 500 ml of dry tetrahydrofuran, 200 g of diisopropylamine, 67 g of divinylbenzene (a mixture of meta- and para-isomers) and 33 g of 2-vinylnaphthalene were placed therein and cooled to 0° C. Subsequently, 190 ml of a 15% by weight hexane solution of n-butyllithium was added dropwise with stirring, after which the resulting mixture was stirred for 24 hours while maintaining the temperature at 0° C. Thereafter, the same procedure as in Synthesis Example 1 were carried out to obtain 75.0 g of a white solid. The weight-average molecular weight thereof was determined by GPC as 73,000. In its NMR spectrum, a broad absorption was observed at δ values of 0.8–3.0, which had a peak at 1.5, and somewhat broad absorptions were observed at 5.0–5.3 and 5.4–5.7, and an absorption was also observed at 6.0–7.9, which had a peak region at 7.2–7.5 and the other part of which had a trapezoid-like shape. From the intensity ratio among the absorptions, the weight ratio of divinylbenzene to vinylnaphthalene was determined to be 2:1. The elementary analysis values were carbon 92.56% and hydrogen 7.3%. Hereinafter, the polymer thus obtained is referred to as VI-30.

SYNTHESIS EXAMPLE 5

A reaction was effected in the same manner as in Synthesis Example 4, except that 20 g of divinylbenzene and 80 g of 2-vinylnaphthalene were used, to obtain 82.0 g of a white solid. The weight-average molecular weight thereof was determined by GPC as 82,000. The locations of the absorptions of its NMR spectrum were substantially the same as those of VI-30. From the relative intensities among the absorptions, the weight ratio of divinylbenzene to 2-vinylnaphthalene was determined to be 1:4. The elementary analysis values were carbon 93.27% and hydrogen 6.70%. Hereinafter, the polymer thus obtained was referred to as VI-31.

SYNTHESIS EXAMPLE 6

Synthesis was carried out in exactly the same manner as in Synthesis Example 4, except that the 67 g of divinylbenzene (a mixture of meta- and para-isomers) was replaced by 50 g of p-divinylbenzene and that the 33 g of 2-vinyl naphthalene was replaced by 50 g of t-stilbene, to obtain 45.0 g of a white solid. The weight-average molecular weight thereof was determined by GPC was 52,000. In its NMR spectrum, a broad absorption was observed at δ values of 0.8–3.1, which had a peak at 1.6, and somewhat broad absorptions were observed at 5.0–5.3 and 5.5–5.9, and a broad absorption was also observed at 6.2–7.7, which had two peaks at 6.6 and 7.1. From the intensity ratio among the absorptions, the molar ratio of divinylbenzene to t-stilbene was determined to be 5:1. The elementary analysis values were carbon 92.43% and hydrogen 7.50%. Hereinafter, the polymer thus obtained was referred to as VI-40.

SYNTHESIS EXAMPLE 7

Using the same apparatus as in Synthesis Example 1, the the same procedure as in Synthesis Example 1 was repeated till the dropwise addition of n-butyllithium. Subsequently, a mixture of 50 g of p-divinylbenzene, 50 g of methyl methacrylate and 200 ml of dried tetrahydrofuran was continuously added at a rate of 60 ml/hr while maintaining the temperature at 0° C., after which the temperature was raised to 20° C., and stirring was further continued in a stream of nitrogen for 8 hours. Thereafter, the same procedures as in Synthesis Example 1 were carried out to obtain 53.0 g of a white solid. The weight-average molecular weight thereof was determined by GPC as 64,000. In its NMR spectrum, a broad absorption was observed at δ values of 0.5–3.0, which had a shoulder at 0.8 and a peak at 1.4–2.0, somewhat broad absorptions were observed at 3.4–3.7, 5.0–5.3 and 5.5–5.8, and a broad absorption was also observed at 6.0–7.5, which had two peaks at 6.5 and 7.1. From the intensity ratio among the absorptions, the molar ratio of divinylbenzene to methyl methacrylate was determined to be 2:1. Typical absorptions in the infrared absorption spectrum were at 1740, 1630, 1510, 1450, 1200, 1170, 990, 910 and 840 cm$^{-1}$. The elementary analysis values were carbon 83.25% and hydrogen 7.80%. Hereinafter, the polymer thus obtained is referred to as VI-50.

SYNTHESIS EXAMPLE 8

Reaction was effected in the same manner as in Synthesis Example 7, except that the methyl methylacrylate was replaced by methacrylonitrile, to obtain 48.5 g of a white solid. The weight-average molecular weight was determined by GPC as 145,000. In its NMR spectrum, a broad absorption was observed at δ values of 0.5–3.0 which had peaks at 0.8, 1.4 and 2.1, and somewhat broad absorptions were observed at 5.0–5.3 and 5.5–5.8, and a broad absorption was also observed at 6.0–7.6, which had two peaks at 6.6 and 7.0. From the intensity ratio among the absorptions, the molar ratio of divinylbenzene to methacrylonitrile was determined to be 3:2. Typical absorptions in the infrared absorption spectrum were at 2250, 1630, 1510, 990, 910 and 840 cm$^{-1}$. The elementary analysis values were carbon 86.93%, hydrogen 7.65% and nitrogen 5.30%. Hereinafter, the polymer thus obtained is referred to as VI-60.

SYNTHESIS EXAMPLE 9

Reaction was effected in the same manner as in Synthesis Example 7, except that the methyl methacrylate was replaced by 2-vinylpyridine, to obtain 57.0 g of a white solid. The weight-average molecular weight was determined by GPC as 22,000. In its NMR spectrum, a broad absorption was observed at δ values of 0.8–3.0, which had two peaks at 1.4 and 1.9, and a somewhat broad absorption was observed at 5.0–5.3, and broad absorptions were also observed at 5.5–6.2, and 6.2–7.5, and a somewhat broad absorption was observed at 7.7–7.9. From the intensity ratio among the absorptions, the molar ratio of divinylbenzene to 2-vinylpyridine was determined to be 1:1. The elementary analysis values were carbon 86.69%, hydrogen 7.26% and nitrogen 5.95%. Hereinafter, the polymer thus obtained is referred to as VI-70.

SYNTHESIS EXAMPLE 10

Reaction was effected in the same manner as in Synthesis Example 7, except that the methyl methacrylate was replaced by phenyl isopropenyl ketone, to obtain 45.0 g of a white solid. The weight-average molecular weight was determined by GPC as 4,000. In its NMR spectrum, a broad absorption was observed at δ values of 0.5–3.0 which had peaks at 0.9, 1.5 and 2.0, and somewhat broad absorptions were observed at 5.0–5.3 and 5.5–5.8, and a broad absorption was also observed at 6.0–7.5, which had three peaks at 6.5, 7.1 and 7.4, and a somewhat broad absorption was observed at 7.7–7.9. From the intensity ratio among the absorptions, the molar ratio of divinylbenzene to phenyl isopropenyl ketone was determined to be 1:1. Typical absorptions in the infrared absorption spectrum appeared at 1695, 1620, 1600, 1500, 1450, 1280, 1080, 1030, 970 and 830 $cm^{-1}$. The elementary analysis values were carbon 86.96% and hydrogen 7.14%. Hereinafter, the polymer thus obtained is referred to as VI-80.

SYNTHESIS EXAMPLE 11

Reaction was effected in the same manner as in Synthesis Example 7, except that the methyl methacrylate was replaced by methyl α-chloroacrylate, to obtain 47.0 g of a white solid. The weight-average molecular weight was determined by GPC as 22,000. In its NMR spectrum, a broad absorption was observed at δ values of 0.8–3.0 which had peaks at 1.5 and 2.0, and somewhat broad absorptions were observed at 3.4–3.7, 5.0–5.3 and 5.5–5.8, and a broad absorption was also observed at 6.0–7.5, which had peaks at 6.5 and 7.1. From the intensity ratio among the absorptions, the molar ratio of divinylbenzene to phenyl isopropenyl ketone was determined to be 3:1. Typical absorptions in the infrared absorption spectrum appeared at 1740, 1630, 1510, 1450, 1190, 990, 840 and 710 $cm^{-1}$. The elementary analysis values were carbon 79.80%, hydrogen 6.90% and chlorine 6.98%. Hereinafter, the polymer thus obtained is referred to as VI-90.

SYNTHESIS EXAMPLE 12

In a 5-liter flask equipped with a stirrer and a dropping funnel were placed 3.0 liters of tetrahydrofuran dried by use of molecular sieves and 300 g of diisopropylamine, and cooled to 4° C., after which 170 ml of a 15% by weight hexane solution of n-butyllithium was added with sufficient stirring. Thereto was added 125 g of purified p-divinylbenzene while maintaining the temperature at about 20° C. After the resulting mixture was stirred continuously for 1 hour, 20 ml of methanol was added. The white precipitate formed in a small amount was removed by filtration, after which 20 liters of methanol was added to the residue to isolate linear polydivinylbenzene as a white precipitate. This precipitate was sufficiently washed with methanol and then dried under reduced pressure. The yield was 90%.

The weight-average molecular weight of the polymer thus obtained was 42,000 as determined by gel permeation chromatography (GPC) was 42,000. The δ values of the nuclear magnetic resonance spectrum ($CDCl_3$) were 1.0–2.5 (br, m, 3H), 5.0–5.4 (br, d, 1H), 5.5–5.9 (br, d, 1H), 6.2–6.9 (br, m, 3H), and 6.0–7.6 (br, m, 2H). In the parentheses, the symbol br denotes a broad absorption, the symbol d denotes a doublet, the symbol m denotes a multiplet, and for example, the symbol 3H denotes an absorption corresponding to three hydrogen atoms. Hereinafter, the polymer is referred to as VI-100.

EXAMPLE 1

In a 100-ml reactor equipped with a thermometer and a stirrer were placed 2.6 g of VI-10, 30 ml of methylene chloride and 0.9 g of sodium hydrogencarbonate, and cooled to 5° C. A solution of 1.8 g of m-chloroperbenzoic acid in 24 ml of methylene chloride was added dropwise with stirring, and the reaction solution thus obtained was than stirred for 24 hours while maintaining it at 5° C. After it was confirmed by use of starch-iodine paper that the m-chloroperbenzoic acid in the reaction solution disappeared, the reaction solution was washed three times with a saturated aqueous sodium hydrogen-carbonate solution and dried over anhydrous magnesium sulfate. The drying agent was removed by filtration, after which the methylene chloride was removed by distillation under reduced pressure to obtain 2.6 g of white powder. The powder was readily soluble in an organic solvent such as toluene, methyl ethyl ketone, ethyl acetate, chloroform or the like. The weight-average molecular weight thereof was determined by GPC as 52,000. In its NMR spectrum, a broad absorption was observed at δ values in the vincinity of 0.8–3.0, which had a peak at 1.5, somewhat broad absorptions were observed at 2.8, 3.1, 3.8, 5.2 and 5.7, and a broad absorption was also observed at 6.0–7.6, which had peaks at 6.6 and 7.1. Typical absorptions in the infrared absorption spectrum appeared at 1630, 1490, 1460, 1255, 1030, 990, 905, 835, 730 and 690 $cm^{-1}$. The epoxy equivalent determined by iodometry was 250 g/mole of epoxy. From the intensity ratio among the absorptions in the NMR spectrum and the epoxy equivalent, the degree of epoxidation of the vinyl groups was determined to be 85%. The elementary analysis values were carbon 86.70% and hydrogen 7.26%. Hereinafter, the product of this Example is referred to as EP-10.

EXAMPLE 2

Reaction was effected in the same manner as in Example 1, except that 0.5 g of sodium hydrogencarbonate, 1.5 g of perbenzoic acid in place of the m-chlorobenzoic acid and 50 ml of methylene chloride were used, to obtain, as in Example 1, 2.5 g of white powder. The number average molecular weight thereof was determined by GPC as 50,000. The locations of absorptions in its NMR spectrum and infrared absorption spectrum were substantially the same as those of the product obtained in Example 1. The epoxy equivalent determined by iodometry was 450 g/mole of epoxy.

From the intensity ratio among the absorptions in the NMR spectrum and the epoxy equivalent, the degree of epoxidation of the vinyl groups was determined to be 50%. The elementary analysis values were carbon 88.95% and hydrogen 7.39%. Hereinafter, the product of this Example is referred to as EP-11.

EXAMPLES 3 TO 14

Reaction was effected in the same manner as in Example 1, except that each of the polymers shown in Table 1, sodium hydrogencarbonate and m-chloroperbenzoic acid were used in the respective amounts shown therein.

TABLE 1

| Example No. | Polymer (g) | Sodium hydrogen-carbonate (g) | MCPBA* (g) | Designation of product (g) |
|---|---|---|---|---|
| 3 | VI-10 (4.5) | 0.45 | 0.9 | EP-12 (4.5) |
| 4 | VI-11 (4.4) | 0.9 | 1.8 | EP-13 (4.3) |
| 5 | VI-20 (4.0) | 0.9 | 1.8 | EP-20 (4.0) |
| 6 | VI-30 (3.1) | 0.9 | 1.8 | EP-30 (3.1) |
| 7 | VI-30 (7.2) | 0.3 | 0.6 | EP-31 (7.2) |
| 8 | VI-31 (8.6) | 0.9 | 1.8 | EP-32 (8.6) |
| 9 | VI-40 (3.5) | 0.9 | 1.8 | EP-40 (3.4) |
| 10 | VI-50 (4.7) | 0.9 | 1.8 | EP-50 (4.6) |
| 11 | VI-60 (3.0) | 0.9 | 1.8 | EP-60 (3.0) |
| 12 | VI-70 (3.5) | 0.9 | 1.8 | EP-70 (3.4) |
| 13 | VI-80 (3.6) | 0.9 | 1.8 | EP-80 (3.5) |
| 14 | VI-90 (2.4) | 0.9 | 1.8 | EP-90 (2.4) |

Note:
*MCPBA: m-Chloroperbenzoic acid

The weight-average molecular weights determined by GPC of the respective products, the epoxy equivalents determined by iodometry, the degrees of epoxidation determined from the epoxy equivalents and the intensity ratios among absorptions in the NMR spectra, and the elementary analysis values are shown in Table 2.

TABLE 2

| Designation of product | Number average molecular weight | Epoxy equivalent (g/mole epoxy) | Degree of epoxidation (%) | Elementary analysis values Carbon (%) | Elementary analysis values Hydrogen (%) | |
|---|---|---|---|---|---|---|
| EP-12 | 52,000 | 850 | 25 | 90.50 | 7.45 | |
| EP-13 | 35,000 | 440 | 80 | 88.81 | 7.40 | |
| EP-20 | 33,000 | 410 | 80 | 89.13 | 6.78 | |
| EP-30 | 78,000 | 3,110 | 70 | 87.43 | 6.90 | |
| EP-31 | 73,000 | 2,100 | 10 | 91.80 | 7.32 | |
| EP-32 | 88,000 | 840 | 90 | 92.50 | 6.50 | |
| EP-40 | 52,000 | 350 | 50 | 88.50 | 6.90 | |
| EP-50 | 64,000 | 470 | 40 | 80.53 | 7.56 | |
|  |  |  |  |  |  | Nitrogen % |
| EP-60 | 153,000 | 310 | 60 | 82.33 | 7.11 | 5.10 |
| EP-70 | 23,000 | 350 | 70 | 82.70 | 6.85 | 5.60 |
| EP-80 | 4,500 | 360 | 80 | 82.98 | 6.89 | |
|  |  |  |  |  |  | Chlorine |
| EP-90 | 23,000 | 350 | 50 | 76.20 | 6.49 | 6.60 |

The δ values of the NMR spectrum of each of the products are shown in Table 3.

TABLE 3

| Designation of product | δ values (shape) |
|---|---|
| EP-12 | 0.8–3.0(br, 1.5p) 2.8(br, s) 3.1(br, s) 3.8(br,s) 5.2(br,s) 5.7(br,s) 6.0–7.6(br,m,6.5p 7.1p) |
| EP-13 | 0.8–3.0(br,1.5p) 2.8(br,s) 3.1(br,s) 3.8(br,s) 5.2(br,s) 5.7(br,s) |
| EP-20 | 6.0–7.6(br,m, 6.6sd 7.1p) 0.8–3.0(br.1.5p) 2.8(br,s) 3.1(br,s) 3.8(br,s) 5.2(br,s) 5.8(br,s) |
| EP-30 | 6.0–7.6(br,m, 6.5sd 7.0p) 0.8–3.0(br,1.5p) 2.7(br,s) 3.1(br,s) 3.8(br,s) 5.2(br,s) 5.7(br,s) |
| EP-31 | 6.0–7.9(br,m,7.3p) 0.8–3.0(br,1.5p) 2.7(br) 3.1(br) 3.8(br) 5.2(br,s) 5.7(br,s) 6.0–7.9(br,m,7.3p) |
| EP-32 | 0.8–3.0(br,1.5p) 2.7(br) 3.1(br,s) 3.8(br) 5.2(br) 5.8(br) 6.0–7.9(br,m,7.3p) |
| EP-40 | 0.8–3.1(br,1.6p) 2.8(br) 3.1(br) 3.8(br) 5.2(br) 5.7(br) 6.2–6.7(br,m,6.6p 7.1p) |
| EP-50 | 0.5–3.0(br,m, 0.8sd 1.7p) 2.8(br,s) 3.1(br,s) 3.6(br,s) 3.8(br,s) 5.2(br,s) 5.8(br,s) 6.0–7.5(br,m,6.5p 7.1p) |
| EP-60 | 0.5–3.0(br,m, 0.8sd 1.4p 2.1p) 2.8(br,s) 3.1(br,s) 3.8(br,s) 5.1(br,s) 5.7(br,s) 6.0–7.6(br,m,6.6p 7.0p) |
| EP-70 | 0.8–3.0(br,m, 1.4p 1.9p) 2.8(br,s) 3.1(br,s) 3.8(br,s) 5.2(br,s) 5.5–6.2(br,m) 6.2–7.5(br,m) 7.8(br,s) |
| EP-80 | 0.5–3.0(br,m,0.9p 1.5p 2.0p) 2.8(br,s) 3.1(br,s) 3.8(br,s) 5.2(br,s) 5.7(br,s) 6.0–7.5(br, m. 6.5p 7.1p 7.4p) 7.8(br,s) |
| EP-90 | 0.8–3.0(br,m, 1.6p 2.0p) 2.8(br,s) 3.1(br,s) 3.6(br,s) 3.8(br,s) 5.2(br,s) 5.8(br, s) 6.0–7.5(br, m, 6.5p 7.1p) | br: a broad absorption
m: a broad shape composed of many peaks
p: the existence of a peak at the position corresponding to each figure
s: a single absorption
sd: the existence of a shoulder of an absorption at the position corresponding to each figure Typical absorption values of the infrared absorption spectrum of each of the products are shown in Table 4.

TABLE 4

| Designation of product | Typical infrared absorption values (cm$^{-1}$) |
|---|---|
| EP-12 | 1630, 1460, 1225, 1030, 990, 905, 835, 730, 690 |
| EP-13 | 1630, 1605, 1460, 1255, 1030, 990, 905, 892, 835, 730, 690 |
| EP-20 | 1625, 1450, 1220, 1020, 990, 890, 835, 740, 700 |
| EP-30 | 1630, 1600, 1500, 1250, 990, 905, 850, 835, 820, 740 |
| EP-31 | 1600, 1490, 1245, 990, 905, 850, 820, 740 |
| EP-32 | 1630, 1605, 1225, 990, 905, 892, 835, 740 |
| EP-40 | 1630, 1450, 1225, 1020, 990, 890, 835, 740, 700 |
| EP-50 | 1740, 1630, 1605, 1510, 1450, 1255, 990, 905, 890, 835 |
| EP-60 | 2250, 1630, 1605, 1510, 1250, 990, 910, 895, 830 |
| EP-70 | 1630, 1590, 1440, 1225, 985, 905, 890, 840, 750 |
| EP-80 | 1695, 1625, 1600, 1505, 1450, 1280, 1080, 990, 890, 835 |
| EP-90 | 1740, 1630, 1510, 1450, 1225, 990, 905, 890, 840, 710 |

EXAMPLE 15

In a 100-ml reactor equipped with a thermometer and a stirrer were placed 2.6 g of the polymer (VI-100), 30 ml of methylene chloride and 0.9 g of sodium hydrogencarbonate, and cooled to 5° C. A solution of 1.8 g of m-chloroperbenzoic acid in 24 ml of methylene chloride was added dropwise with stirring, and the reaction solution thus obtained was then stirred for 24 hours while it was maintained at 5° C. After it was confirmed by use of starch-iodine paper that the m-chloroperbenzoic acid in the reaction solution disappeared, the reaction solution was washed three times with a saturated aqueous sodium hydrogencarbonate solution and dried over anhydrous magnesium sulfate. The drying agent was removed by filtration, after which the methylene chloride was removed by distillation under reduced pressure to obtain 2.6 g (yield 94%) of ½ epoxidized linear polydivinylbenzene.

The infrared absorption spectrum of the white powder thus obtained showed the following absorptions (cm$^{-1}$): 1630, 1255, 990, 905 and 835. The $\delta$ values of its nuclear resonance spectrum (CDCl$_3$) were 1.0–2.5 (m, 6H), 2.7 (m, 1H), 3.1 (m, 1H), 3.8 (m, 1H), 5.2 (m, 1H), 5.8 (m, 1H) and 6.8–7.2 (m, 10H). In the parentheses, the symbol m denotes a multiplet and, for example, the symbol 6H denotes an absorption corresponding to 6 hydrogen atoms. The epoxy equivalent determined by iodometry was 280 g/mole of epoxy. The elementary analysis values were carbon 87.10% and hydrogen 7.40%. Hereinafter, the product of this Example is referred to as EP-100.

EXAMPLE 16

An epoxy compound was prepared in the same manner as in Example 15, except that 1.8 g of sodium hydrogencarbonate, 3.5 g of perbenzoic acid in place of the m-chloroperbenzoic acid and 50 ml of methylene chloride were used. The epoxy equivalent of the compound obtained was 154 g/mole of epoxy. The results of elementary analysis were as follows: Carbon 82.9% and hydrogen 7.0%. Said epoxy compound is hereinafter referred to as EP-101.

EXAMPLE 17

An epoxy compound was prepared in the same manner as in Example 15, except that 0.4 g of sodium hydrogencarbonate and 0.8 g of m-chloroperbenzoic acid were used. The epoxy compound obtained had an epoxy equivalent of 800, and its elementary analysis values were carbon 90.8% and hydrogen 7.1%. This epoxy compound is hereinafter referred to as EP-102.

EXAMPLE 18

EP-10 was dissolved in toluene to form a 10% solution and this solution was filtered through a 0.2 $\mu$m filter to prepare a resist solution. This resist solution was spin-coated on a silicon wafer at 3,000 r.p.m. and vacuum dried at 60° C. for 30 minutes to obtain a uniform coating film having a thickness of 1.0 $\mu$m. This was exposed in an electron beam exposing apparatus (ELS-3300 by ELIONIX) at an acceleration voltage of 20 KV with a varying exposure and line width to draw line-and-space patterns. The patterned wafer was taken out of the apparatus, immersed in methyl isobutyl ketone for 20 seconds, then spray washed to dissolve out the unexposed portion to develop the pattern image. This was further immersed in isopropyl alcohol for 30 seconds to rinse the image to obtain a resist pattern. This was subjected to post-baking at 150° C. for 30 minutes and film thickness was measured by a feeler method (with TALYSTEP-1 manufactured by TAYLOR-HOBSON) to examine the relation between exposed charge density and film thickness after development. Such an exposure ($D_g^{0.5}$) that the residual film thickness was one-half of the original film thickness was $5.0 \times 10^{-7}$ coulomb/cm$^2$, and its $\gamma$ value was 2.1.

When the sections of the line-and-space pattern samples having different line widths obtained at an exposure of $5.0 \times 10^{-7}$ coulomb/cm$^2$ were observed by SEM (scanning electron microscope), there were seen sharp, 1-$\mu$m line-and-space rectangular sections, and it was found that these samples had a resolution of 1 $\mu$m or less.

In order to examine the dry etching resistance of this copolymer, a coating film was formed on a silicon wafer in the same manner as described above and the coating film was exposed by irradiation with deep ultraviolet rays at a rate of 10 mJ/cm$^2$ (using Deep UV lamp UXM500MX mfd. by Ushio Electric) and then subjected to reactive spattering (under the conditions of 0.05 Torr, 13.65 MHz and 200 W, using a mixed gas of 95% of CF$_4$ and 5% of O$_2$). The result showed that the etching speed was 400 Å/min, which was about ⅓ of the etching speed (1,200 Å/min) of the polysilicon substrate.

COMPARATIVE EXAMPLE 1

A commercially available resist (PMMA type, OEBR-1000 ® manufactured by Tokyo Ohka) was evaluated in the same manner as in Example 18 to find that the sensitivity was $5 \times 10^{-4}$ coulomb/cm$^2$ and the $\gamma$ value was 3.0. In addition, the negative type resist (PGMA type, OEBR-100 ® manufactured by Tokyo Ohka) was similarly evaluated to find that the sensitivity was $4.5 \times 10^{-6}$ coulomb/cm$^2$ and $\gamma$ value 1.6. The same evaluation as in Example 18 was conducted on another commercially available resist (AZ-1350J of SHIPLEY) to find that the etching speed was 580 Å/min.

EXAMPLES 19–34

The copolymers synthesized in Examples 2 to 16 were evaluated as resists in the same manner as in Example 18. The results are shown in Table 5.

TABLE 5

| Example No. | Designation of product | Sensitivity (coulomb/cm$^2$) | $\gamma$ value | Resolution ($\mu$m) | Etching speed (Å/min) |
|---|---|---|---|---|---|
| 19 | EP-11 | $1.0 \times 10^{-6}$ | 2.0 | 1.0 | 270 |
| 20 | EP-12 | $1.0 \times 10^{-6}$ | 1.9 | 1.0 | 240 |
| 21 | EP-13 | $2.0 \times 10^{-6}$ | 1.7 | 1.0 | 200 |
| 22 | EP-20 | $1.5 \times 10^{-6}$ | 1.9 | 1.0 | 180 |
| 23 | EP-30 | $5.0 \times 10^{-7}$ | 2.3 | 1.5 | 170 |
| 24 | EP-31 | $3.0 \times 10^{-6}$ | 1.6 | 1.0 | 130 |
| 25 | EP-32 | $1.0 \times 10^{-5}$ | 1.6 | 1.5 | 100 |
| 26 | EP-40 | $6.0 \times 10^{-7}$ | 2.0 | 1.5 | 240 |
| 27 | EP-50 | $2.0 \times 10^{-6}$ | 1.8 | 0.5 | 450 |
| 28 | EP-60 | $4.0 \times 10^{-7}$ | 2.2 | 1.0 | 230 |
| 29 | EP-70 | $2.0 \times 10^{-6}$ | 1.9 | 1.0 | 270 |
| 30 | EP-80 | $3.0 \times 10^{-6}$ | 2.3 | 0.5 | 300 |
| 31 | EP-90 | $3.0 \times 10^{-6}$ | 2.0 | 1.0 | 320 |
| 32 | EP-100 | $6.0 \times 10^{-7}$ | 2.0 | 1.5 | 220 |
| 33 | EP-101 | $2.0 \times 10^{-7}$ | 2.3 | 2.0 | 250 |
| 34 | EP-102 | $9.0 \times 10^{-7}$ | 2.2 | 1.0 | 200 |

EXAMPLE 35

EP-11 (7.5 g), benzophenone (0.375 g) and bis-(dimethylamino)benzophenone (0.075 g) were dissolved in toluene to form a 15% solution. This solution was spin-coated on a silicon wafer at 1,000 r.p.m. for 10 seconds and vacuum-dried at 60° C. for 30 minutes to obtain a uniform film having a thickness of 1.5 $\mu$m. The resist film thus obtained was exposed to UV radiation through a pattern mask by means of an ultra high pressure mercury lamp (2 kW). After exposure of 120 mJ/cm², the result was developed with methyl isobutyl ketone and rinsed with isopropyl alcohol. It was found that this sample had a resolution of 0.5 μm or less.

REFERENTIAL EXAMPLE 1

In 1.0 g of toluene was dissolved 1.4 g of EP-10, and a mixed solution of 0.1 g of triethylenetetramine and 0.2 g of toluene was added as a curing agent, and they were uniformly mixed, after which the resulting mixture was applied to a glass plate by means of a bar coater and allowed to stand at room temperature to find that it gelled in 25 minutes. Further, the mixture applied was dried at 100° C. for 3 hours to remove the solvent. The coating film thus formed was peeled off and then immersed in 25% by weight acetic acid for 28 days to find that the weight of the coating film decreased by 3%.

REFERENTIAL EXAMPLES 2 to 9

The same procedure as in Referential Example 1 was repeated, except that EP-10 was replaced by other epoxy compounds. The results are shown in Table 6.

TABLE 6

| Referential Example No. | Epoxy compound | Curing time (min) | Weight loss (%) |
|---|---|---|---|
| 2 | EP-11 | 40 | 4.0 |
| 3 | EP-13 | 30 | 0.3 |
| 4 | EP-20 | 15 | 1.5 |
| 5 | EP-30 | 10 | 1.8 |
| 6 | EP-32 | 60 | 0.2 |
| 7 | EP-40 | 5 | 3.0 |
| 8 | EP-100 | 15 | 2.5 |
| 9 | EP-102 | 18 | 0.4 |

COMPARATIVE EXAMPLE 2

As an epoxy compound, 20 g of a commercially available bisphenol A type epoxy resin ("AER-331" manufactured by Asahi Kasei Kogyo Kabushiki Kaisha, epoxy equivalent 190) was mixed with 2.2 g of diethylenetriamine, and the resulting mixture was formed into a film and allowed to stand at room temperature for 5 days. When the cured coating film thus obtained was immersed in by weight acetic acid for 28 days, its weight decreased by 6.2%.

What is claimed is:

1. A copolymer having a weight average molecular weight of 500 to 5,000,000 and comprising 2 to 60% by weight of a recurring unit represented by the formula (I), 10 to 70% by weight of a recurring unit represented by the formula (II) and 10 to 90% by weight of a recurring unit represented by the formula (III):

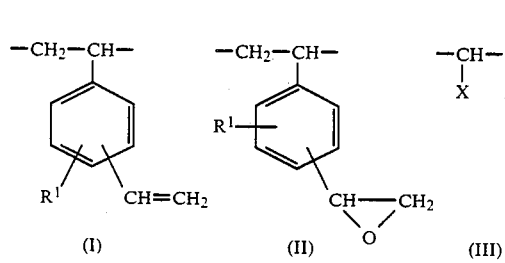

wherein $R^1$ is a hydrogen atom or a methyl group; X is a hydrogen atom, a methyl group or a phenyl group; Y is a hydrogen atom, a halogen atom, a methyl group, a phenyl group or a cyano group; and Z is a phenyl group, a phenyl group substituted by at least one alkyl group having 1 to 8 carbon atoms, a polycyclic aromatic hydrocarbon group having 10 to 20 carbon atoms, a cyano group, —COOR² (in which R² is an alkyl group having 1 to 20 carbon atoms or an aromatic hydrocarbon group having 6 to 14 carbon atoms), —COR³ (in which R³ is an alkyl group having 1 to 12 carbon atoms or an aromatic hydrocarbon group having 6 to 14 carbon atoms), a nitro group, a pyridyl group,

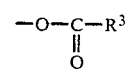

(in which $R^3$ has the same meaning as defined above), or a halogen atom.

2. The copolymer according to claim 1, wherein $R^1$ is a hydrogen atom.

3. The copolymer according to claim 1, wherein the position of the vinyl group in relation to the main chain in the formula (I) and the position of the epoxy group in relation to the main chain in the formula (II) are metapositions or parapositions.

4. The copolymer according to claim 3, wherein the position of the vinyl group in relation to the main chain in the formula (I) and the position of the epoxy group in relation to the main chain in the formula (II) are parapositions.

5. The copolymer according to claim 2, wherein X is a hydrogen atom.

6. The copolymer according to claim 2, wherein X is a phenyl group.

7. The copolymer according to claim 2, wherein Y is a hydrogen atom.

8. The copolymer according to claim 2, wherein Y is a phenyl group.

9. The copolymer according to claim 2, wherein Z is a phenyl group or a phenyl group substituted by at least one alkyl group having 1 to 8 carbon atoms.

10. The copolymer according to claim 2, wherein Z is a polycyclic aromatic hydrocarbon group.

11. The copolymer according to claim 2, wherein each of X and Y is a hydrogen atom and Z is a phenyl group.

12. The copolymer according to claim 2, wherein X is a phenyl group, Y is a hydrogen atom, and Z is a phenyl group.

13. The copolymer according to claim 2, wherein X is a hydrogen atom and each of Y and Z is a phenyl group.

14. The copolymer according to claim 2, wherein each of X and Y is a hydrogen atom and Z is a naphthyl group.

15. The copolymer according to claim 2, wherein each of X and Y is a hydrogen atom and Z is an ethyl-substituted phenyl group.

16. The copolymer according to claim 1, wherein the proportions of the recurring units represented by the formulae (I), (II) and (III) are 10 to 50% by weight, 20 to 60% by weight and 30 to 70% by weight, respectively.

17. The copolymer according to claim 1, wherein the molecular weight is 1,000 to 1,000,000.

18. The copolymer according to claim 17, wherein the molecular weight is 3,000 to 300,000.

19. A resist material which can be cured upon irradiation with a high-energy radiation and comprises a copolymer having a weight average molecular weight of 500 to 5,000,000 and comprising 1 to 99% by weight of a recurring unit represented by the structural formula (I), 1 to 99% by weight of a recurring unit represented by the formula (II) and 0 to 98% by weight of a recurring unit represented by the formula (III):

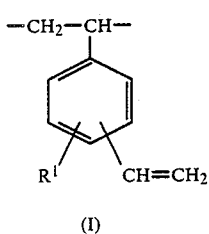 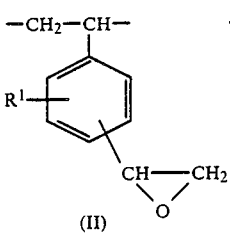 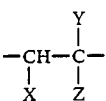

(I)　　　　　　(II)　　　　　(III)

wherein $R^1$ is a hydrogen atom or a methyl group; X is a hydrogen atom, a methyl group or a pheny group; Y is a hydrogen atom, a halogen atom, a methyl group, a phenyl group or a cyano group; and Z is a phenyl group, a phenyl group substituted by at least one alkyl group having 1 to 8 carbon atoms, a polycyclic aromatic hydrocarbon group having 10 to 20 carbon atoms, a cyano group, $-COOR^2$ (in which $R^2$ is an alkyl group having 1 to 20 carbon atoms or an aromatic hydrocarbon group having 6 to 14 carbon atoms), $-COR^3$ (in which $R^3$ is an alkyl group having 1 to 12 carbon atoms or an aromatic hydrocarbon group having 6 to 14 carbon atoms), a nitro group, a pyridyl group,

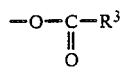

(in which $R^3$ has the same meaning as defined above), or a halogen atom.

20. The resist material according to claim 19, wherein the high-energy radiation is electron beam, ultraviolet ray or X-ray.

* * * * *